United States Patent

[11] 3,551,633

[72] Inventors Wilhelm Wattler
　　　　　　Cologne-Zollstock;
　　　　　　Adolf Englisch, Cologne-Raderthal,
　　　　　　Germany
[21] Appl. No. 745,335
[22] Filed July 12, 1968
[45] Patented Dec. 29, 1970
[73] Assignee Meyer, Roth & Pastor
　　　　　　Raderbergerstrasse, Germany,
　　　　　　a corporation of Germany
[32] Priority July 18, 1967
[33] Germany
[31] No. M74 797

[54] PROCESS AND APPARATUS FOR THE BUTT WELDING OF CHAIN LINKS
7 Claims, 3 Drawing Figs.

[52] U.S. Cl. ........................... 219/51,
　　　　　　　　　　　　　　　　　219/101, 219/150
[51] Int. Cl. ................................. B21l 3/02
[50] Field of Search ......................... 219/51, 52,
　　　　　　　　　　　　　150, 151, 152, 154, 101, 104

[56] References Cited
UNITED STATES PATENTS
2,684,422   7/1954   Esser et al ............... 219/51
3,350,533   10/1967  Kleine-Weischede ...... 219/51

Primary Examiner—J. V. Truhe
Assistant Examiner—Hugh D. Jaeger
Attorney—Richards & Geir ABSTRACT: The invention refers to a process and apparatus for electrical pressure butt welding of various articles, such as wires, particularly bent C-shaped chain links, whereby, the ends to be welded are moved toward each other up to contact, then the welding current is applied, the ends to be welded are heated, then the current is switched off and the ends are upset. The invention is particularly characterized in that, during the heating, the ends are moved by a power-applying adjustable drive while, during the upsetting operation, they are moved by direct guided motion.

PATENTED DEC 29 1970 3,551,633

WILHELM WATTLER and ADOLF ENGLISCH
INVENTORS

BY Richards & Geier

ATTORNEYS

PROCESS AND APPARATUS FOR THE BUTT WELDING OF CHAIN LINKS

DESCRIPTION OF THE INVENTION

This invention relates to a process and an apparatus for the butt welding of chain links.

The welding of chain links by the so-called pressure butt welding process is the oldest electrical welding process. During these earlier procedures, pressure required for the welding was produced by rigid pressing levers actuated by cams. The pressures were transmitted rigidly. In those days the results were considered satisfactory.

However, soon there appeared the desire to weld better and more precisely and then the machines were changed in that the welding and upsetting pressures were produced by strong springs. This increased the application possibilities of the machines, since the necessary amount of pressure could be easier adapted to the requirements. From two to eight pressure springs were used; their number depended upon the diameter of the chain, the type of material and its strength. These springs operated by means of rods and levers the tools which pressed toward each other the ends of the chain links.

This method of welding chain links by mechanically operating machines has remained in use up to the present time. The drawback of this type of welding consists in that it cannot be used successfully in continuous operation for the butt welding of the highly alloyed and thus very hard materials of which the chains are now made.

An object of the present invention is to make it possible to weld chains made of alloyed and hard materials with the smallest possible welding zone and providing a high strength for the connection even after a substantial hardening of the chain in the following heat treatment.

Other objects of the present invention will become apparent in the course of the following specification.

In the accomplishment of the objectives of the present invention it was found desirable to provide a process which combines the two prior art processes and in accordance with which pressure during the entire welding procedure is divided into an adjustable, specifically spring actuated supporting or heating pressure and a guided direct rigid upsetting or welding pressure.

The invention will appear more clearly from the following detailed description when taken in connection with the accompanying drawings, showing by way of example, a preferred embodiment of the inventive idea.

IN THE DRAWINGS

Figure 1:
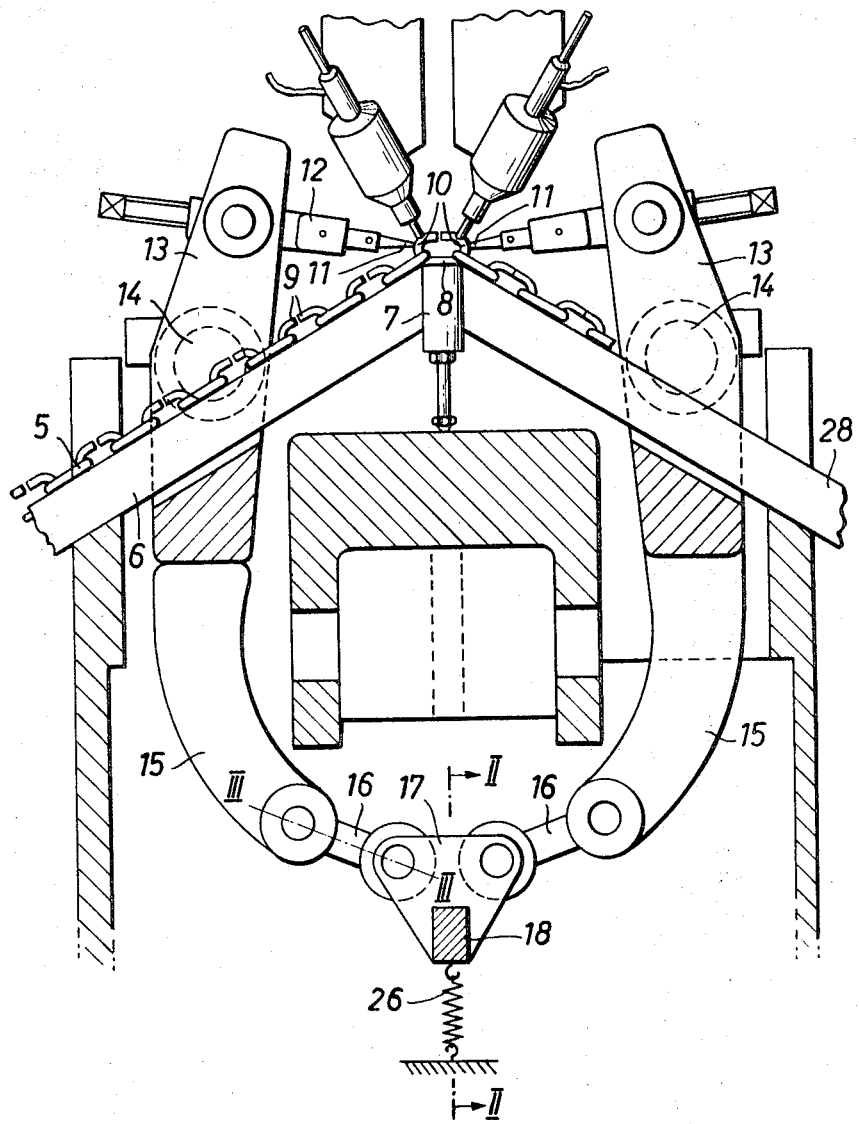
FIG. 1 is a front view, partly in section, of a welding apparatus operating in accordance with the process of the present invention.

FIG. 1 shows a portion of a chain-welding machine various parts of which are known in the art. A chain 5 the links of which have been preliminarily bent, is guided by a guide rail 6 to an anvil 7 in such manner that the links 8 standing upon their sides with upwardly located link ends 9, which are to be welded, are placed one after the other upon the anvil 7. During the welding process the curved portions 10 of the links are pressed by upsetting steels 11 toward each other and at the same time against the anvil, the steels 11 being fixed in holders 12 which are mounted in upsetting levers 13. The levers 13 are mounted at 14 in the frame of the machine; they are two-armed levers having lower longer arms 15 which are interconnected by rods 16 and a plate 17 fixed upon a swinging lever 18.

Figure 2:
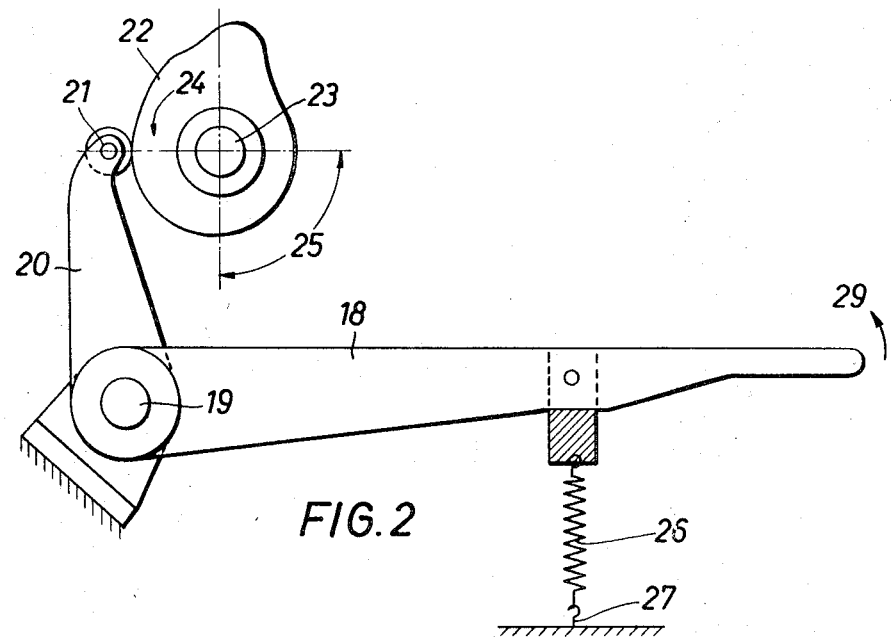
FIG. 2 is a section along the line II-II of FIG. 1.

As shown in FIG. 2, the lever 18 is an angular lever which is mounted at 19 in the machine frame and has a shorter arm 20 carrying a roller 21 engaging a cam 22 mounted on a shaft 23, so that the cam 22 can be rotated in the direction of the arrow 24. The circumferential portion 25 of the cam 22 is circular so that this portion does not provide any movement to the lever. In that position the lever 18 assumes its lowermost position under the action of a spring 26 having one end connected with the lever, while its other end is fixed at 27. The spring 26 provided a continuous engagement of the lever 18, 20 with the cam 22 through the roller 21.

The movement of the chain over the guide rail 6, the anvil 7 and the corresponding guiding rail 28 takes place during this lowermost rest position of the lever 18. During further rotation of the cam 22 in the direction of the arrow 24, the lever 18 moves upwardly in the direction of the arrow 29 against the action of the spring 26 and, acting through the plate 17 and the rods 16, moves the lever arms 15 away from each other, thereby moving the steels 11 toward each other so that the ends 9 of the link 8 are pressed against each other.

Figure 3:
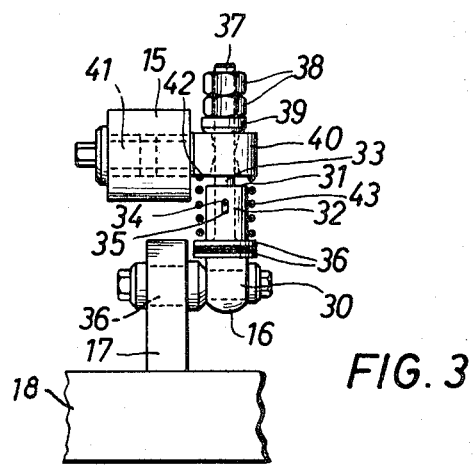
FIG. 3 is a section along the line III-III of FIG. 1, on a somewhat larger scale, through one of the two spring-carrying rods.

As shown in FIG. 3, in accordance with the present invention, each of the rods 16 consists of two telescoping cooperating parts, namely, a part 30 connected by a pivot with the plate 17 and provided at its free end 31 with a bore 32 engaged by the other part 33. This other part 33 has a radial pin 34 extending through a slit 35 provided in the part 30. This arrangement provides for a relative movement of the two telescoping parts of each rod. The hollow part 30 of the rod carries two setscrews 36 which can be shifted and relatively fixed thereon. The bolt-shaped part 33 of the rod is also provided with screw threads at its free end and also carries two setscrews 38, which limit the movement of a stop ring 39 upon the rod part 33 toward the free end of the part. This stop ring engages an annular bolt 40 through which the rod part 33 extends; the bolt 40 has a portion 41 extending through the lever arm 15. Thus the bolt 40 serves as a joint.

A coiled spring 43 is provided between a front surface 42 of the bolt 40 which is directed toward the screws 36 of the rod part 30, and the setscrews 36. As shown in the drawing, the spring 43 tends to move the bolt members 36 and 40, 41 away from each other. The forceful movement transmitted by the use of the cam 22 and the roller 21 engaging the cam by the action of the spring 26, is thus dampened in the direction of the movement by the springs 43 carried by the rods 16 to an extent depending upon the length of the slit 35 in the part 30 of the rod.

The operation of the apparatus is consequently as follows:

At the beginning of the operational cycle the cam 22 rotates in the direction of the arrow 24, but the two lever arms 15 do not move, since the portion 25 of the cam 22 has an unchanging radius. The transportation of the chain takes place at that time. In the course of the further rotation of the cam, the levers 18, 20 are raised in the direction of the arrow 29 and against the action of the spring 26, the pair of levers 15 are spread below, the rods 16 are moved jointly and the chain link is shaped until the required location of the link ends is reached. This transmission of force takes place with the cooperation of the springs 43 carried by the rods 16, the screws 36 being so set that the operation is adapted to the desired extent to the size of the links and the hardness of the material.

If this setting is not possible with an existing installation, the screws 38 can be removed, the connections slackened and a new spring 43 can be provided with different characteristics.

As the cam 22 continues to rotate in the direction of the arrow 24, the parts 30 and 33 of the rods 16 are pressed into each other while compressing the springs 43 to such an extent that the pins 34 engage other ends of the slits 35, so that the drive in the feed direction now takes place, not through adjustable power transmission, but directly. Thus the upsetting process, but only the upsetting process, can be now carried out directly, as was done before.

Thus the present invention makes it possible to carry out an adjustable welding operation by the provision of resilient means, such as springs 43 provided at any location of the power-transmitting means. In the disclosed example, they are located at the rods 16. On the other hand, the upsetting operation is carried out by direct guiding.

It is apparent that the described example of the present invention is subject to many variations and modifications. As has been stated already, the resilient means can be placed at a different location. Furthermore, the stops can be arranged in a different manner. For example, without changing the described construction, it is possible to use selectively as stops either the pins 34 and the slits 35, or the front surface 31 of the rod part 30 and the front surface 42 of the bolt 40. In that case the pin-slit connection 34, 35 is used solely as protection against turning, or it can be eliminated entirely.

Furthermore, the described welding process can be effectively applied not only to C-shaped preliminarily bent chain links, but also to other pieces, such as lengths of rods, for example.

All such and other variations and modifications are to be included within the scope of the present invention.

We claim:

1. A process for butt-welding chain links, which comprises, in combination, preliminarily bending toward each other opposed ends of a link, continuing the bending of said ends to bring them in contact with each other by applying to them yieldable forces increasing up to an adjustable maximum and simultaneously electrically heating the ends, and pressing the ends together to permanently join them by applying to them unvariable upsetting pressure.

2. In an apparatus for butt-welding a chain link having preliminarily bent opposed ends, said apparatus comprising two upsetting steels moving said ends in contact with each other, welding electrodes for welding said ends and means actuating said steels and comprising rigid members, resilient members interconnecting said rigid members and means compressing said resilient members and providing rigid connection between the rigid members, and comprising two two-armed levers, means supporting said levers for pivotal movement symmetrically to the vertical central plane of the link, each of said two-armed levers having a shorter arm and a longer arm, holders carried by the shorter arms of said levers and carrying said upsetting steels, a swinging lever, rods connected with the longer arms of said levers and said swinging lever, resilient members carried by said rods, a cam and means actuated by said cam and actuating said swinging lever.

3. An apparatus in accordance with claim 2, wherein said rigid members consist of two rods having telescoping parts, wherein each resilient member consists of a pressure spring extending between two telescoping parts of a rod and wherein the last-mentioned means limit the telescoping movement of said parts.

4. An apparatus in accordance with claim 3, wherein the last-mentioned means include a spring-engaged front surface.

5. An apparatus in accordance with claim 3, wherein the last-mentioned means include an elongated slit formed on one of said parts and a pin carried by the other one of said parts and extending through said slit.

6. An apparatus in accordance with claim 3, wherein said spring is removably mounted around one of said parts.

7. An apparatus in accordance with claim 6, comprising a set screw adjusting the tension of said spring.